United States Patent
Brummel et al.

(10) Patent No.: US 10,088,830 B2
(45) Date of Patent: Oct. 2, 2018

(54) APPARATUS AND METHOD FOR DETECTING THE CURRENT DAMAGED STATE OF A MACHINE

(71) Applicant: SIEMENS AKTIENGESELLSCHAFT, München (DE)

(72) Inventors: Hans-Gerd Brummel, Berlin (DE); Uwe Pfeifer, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 175 days.

(21) Appl. No.: 15/102,568

(22) PCT Filed: Oct. 28, 2014

(86) PCT No.: PCT/EP2014/073098
§ 371 (c)(1),
(2) Date: Jun. 8, 2016

(87) PCT Pub. No.: WO2015/090698
PCT Pub. Date: Jun. 25, 2015

(65) Prior Publication Data
US 2016/0320767 A1 Nov. 3, 2016

(30) Foreign Application Priority Data
Dec. 16, 2013 (DE) ........................ 10 2013 226 049

(51) Int. Cl.
G05B 19/406 (2006.01)
G05B 19/416 (2006.01)
(Continued)

(52) U.S. Cl.
CPC ........... G05B 19/406 (2013.01); G01H 1/006 (2013.01); G01M 7/00 (2013.01); G05B 19/416 (2013.01);
(Continued)

(58) Field of Classification Search
CPC .. G05B 19/406; G05B 19/416; G05B 23/024; G05B 2219/37371; G05B 2219/37399; G01H 1/006; G01M 7/00
See application file for complete search history.

(56) References Cited

U.S. PATENT DOCUMENTS 6,742,341 B2 * 6/2004 Ryan ........................ F02C 9/28
60/39.281
7,751,943 B2 * 7/2010 Bollhalder ................ F23N 5/16
477/30

(Continued)

FOREIGN PATENT DOCUMENTS

CN 1636133 A 7/2005
CN 101836168 A 9/2010
(Continued)

OTHER PUBLICATIONS

International Search Report; PCT/EP2014/073098; International Filing Date: Oct. 29, 2014; 2 Pgs.

Primary Examiner — Mark A Connolly
(74) Attorney, Agent, or Firm — Schmeiser Olsen & Watts LLP

(57) ABSTRACT

A method and apparatus for detecting the current damaged state of a machine is provided. The disclosed relates to an apparatus for detecting the current damaged state of a machine, wherein the data capture and editing device: comprises a Fast Fourier analysis apparatus, for performing a transformation from pressure signals that are available in the time domain to a frequency domain as discrete-time frequency spectra (2), additionally includes a spatial aggregation unit and a temporal aggregation unit that combines the discrete-time frequency spectra, additionally includes a cepstrum analysis unit, for producing a cepstrum with various actual cepstrum values from the temporally and spatially aggregated discrete frequency spectra (5), additionally (Continued)

Figure 1:
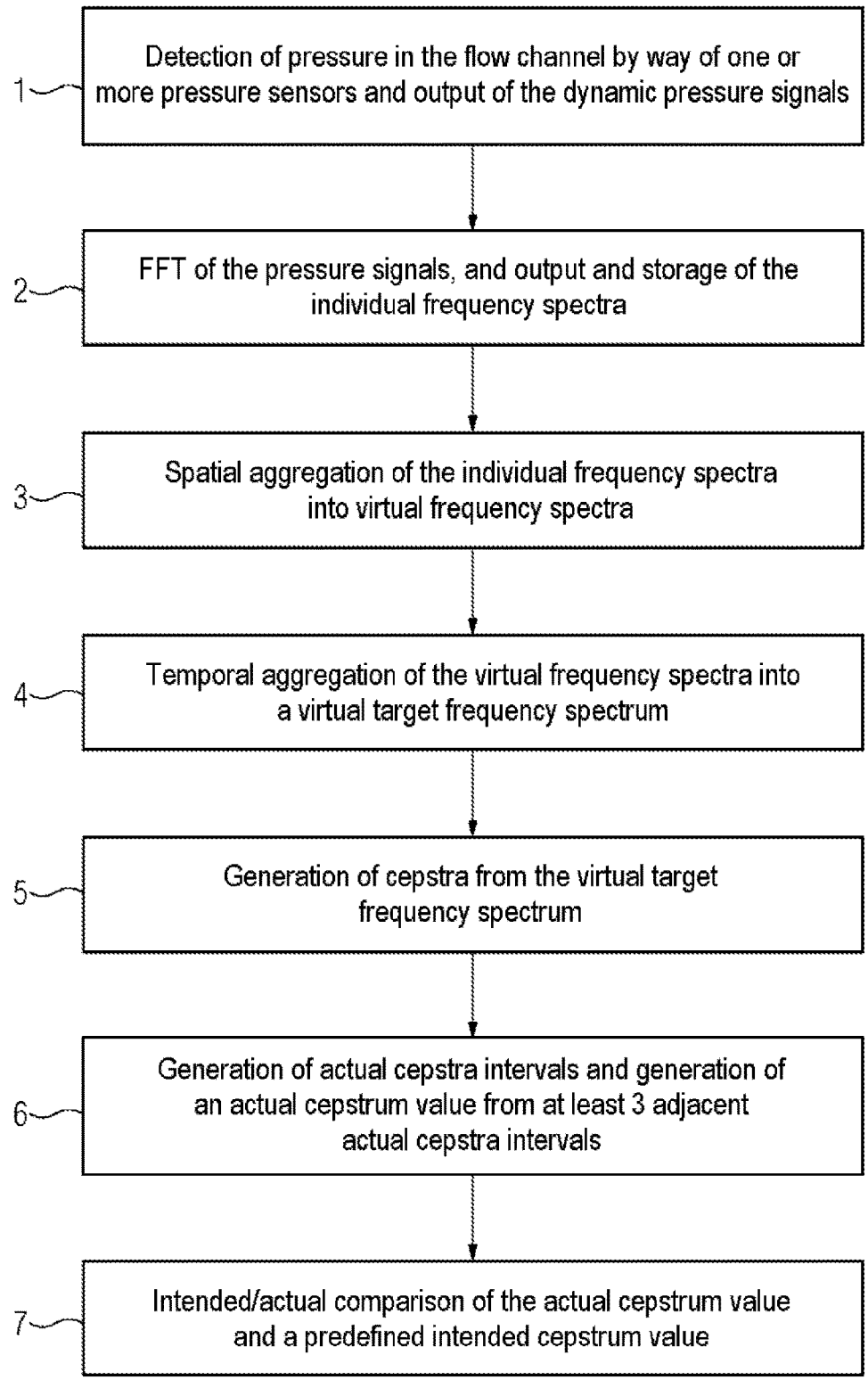

includes a computation unit that takes the cepstra produced in this manner and produces, at a previously defined interval of time, a plurality of actual cepstrum intervals including adjacent actual cepstrum values, as a result of which an actual cepstrum value, which can be ascertained from at least three adjacent actual cepstrum intervals, can be produced (6), includes a unit that computes (7) a target/actual comparison with the actual cepstrum value produced in this manner and a previously determined target cepstrum value.

19 Claims, 2 Drawing Sheets

(51) Int. Cl.
    *G01H 1/00*     (2006.01)
    *G05B 23/02*     (2006.01)
    *G01M 7/00*     (2006.01)

(52) U.S. Cl.
    CPC .. *G05B 23/024* (2013.01); *G05B 2219/37371* (2013.01); *G05B 2219/37399* (2013.01)

(56) References Cited

U.S. PATENT DOCUMENTS

| | | |
|---|---|---|
| 2005/0021267 A1 | 1/2005 | Bechtold et al. |
| 2009/0162186 A1 | 6/2009 | Christinsen et al. |
| 2010/0262401 A1 | 10/2010 | Pfeifer et al. |
| 2011/0137536 A1* | 6/2011 | Tonno ...................... F02C 9/28 701/100 |
| 2013/0006551 A1 | 1/2013 | Sako et al. |

FOREIGN PATENT DOCUMENTS

| | | |
|---|---|---|
| DE | 4447288 | 7/1995 |
| DE | 4447288 A1 | 7/1995 |
| DE | 10144076 A1 | 3/2003 |
| WO | WO2004059399 | 7/2004 |
| WO | WO 2004059399 A2 | 7/2004 |

\* cited by examiner

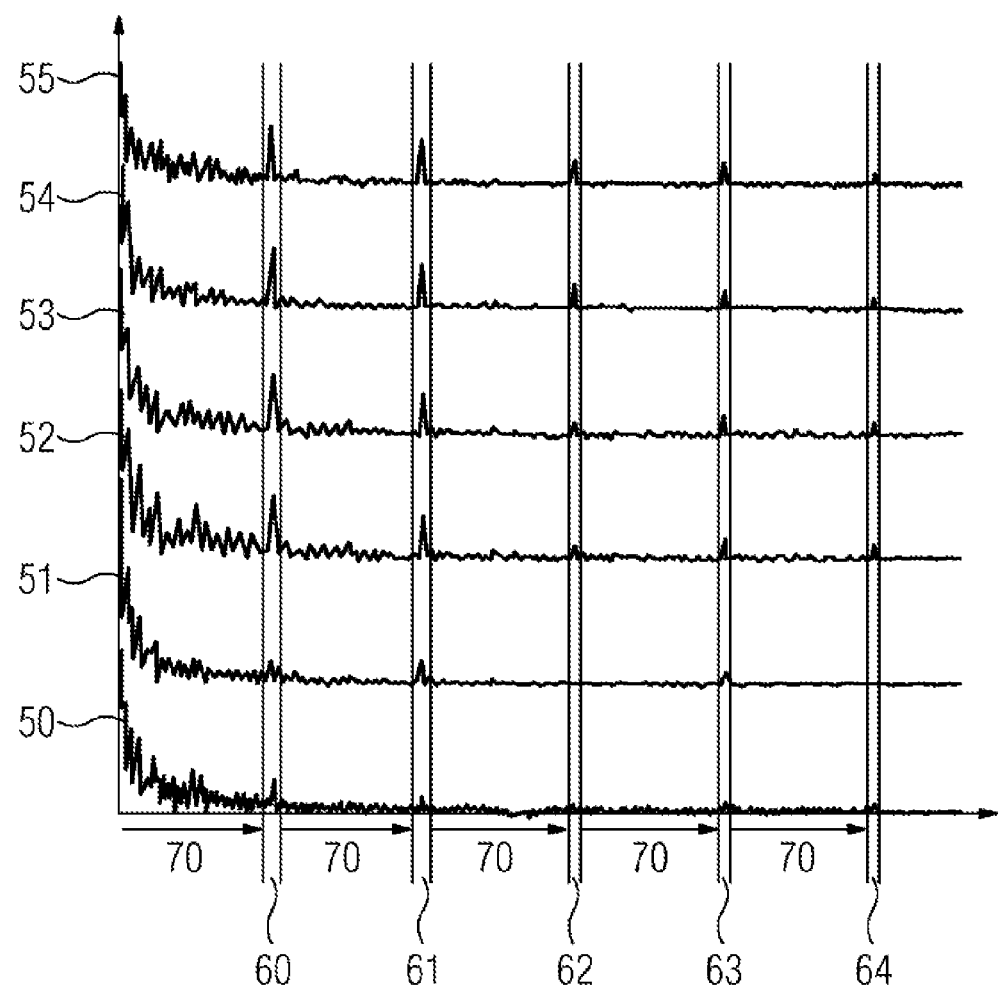

APPARATUS AND METHOD FOR DETECTING THE CURRENT DAMAGED STATE OF A MACHINE

CROSS-REFERENCE TO RELATED APPLICATIONS

This application claims priority to PCT Application No. PCT/EP2014/073098, having a filing date of Oct. 28, 2014, based off of DE Application No. 102013226049.0 having a filing date of Dec. 16, 2013, the entire contents of which are hereby incorporated by reference.

FIELD OF TECHNOLOGY

The following relates to all general machines which are embodied as turbomachines, such as e.g. flow machines, gas turbines, compressors, turbochargers or aero engines.

BACKGROUND

Turbomachines such as e.g. gas turbines are characterized in that they consist of multi-stage compressor and turbine components. Here, a compressor or turbine stage includes a stationary stator blade row and a rotating rotor blade row. The stator blade and rotor blade row consists of a multiplicity of individual blades. Therefore, an overall machine includes several hundred stator and rotor blades. When the machine is in operation, these blades are subject to high mechanical, aerodynamic and thermal loads.

These loads can lead to unwanted damage of the blades. The specific problem existing here has initially only little damage at a single blade being able ultimately to lead to total loss during the course of the further operation of the machine. This damage progression constitutes a known phenomenon and can develop from minimal initial damage to total loss over a period of time of a few minutes to days. Therefore, the pressing problem lies in identifying the small initial damage, which may have multifaceted causes and characteristics, during the operation of the machine and being able to derive a warning. The repair outlay for removing little initial damage is very much smaller than a total loss of the machine, in which all blades and, in part, also further components such as burner, filter, pressure sensors etc. need to be replaced.

SUMMARY

An aspect relates to a device for detecting the current state of damage of a machine, comprising a plurality of pressure sensors for detecting the pressure over a time period of the machine to be monitored and outputting a plurality of pressure signals, wherein the pressure signals exist in the time domain, and a data detection and processing apparatus for detecting the pressure signals from the pressure sensors and processing the pressure signals. According to embodiments of the invention:

the data detection and processing apparatus comprises a fast Fourier analysis device for carrying out a transformation of the pressure signals existing in the time domain into a frequency domain as discrete-time frequency spectra, the data detection and processing apparatus furthermore comprises a spatial aggregation unit and a temporal aggregation unit, which combine the discrete-time frequency spectra, such that temporally and spatially aggregated discrete frequency spectra are generable, wherein the application of the spatial aggregation unit and also the application of the temporal aggregation unit is performable in a different sequence on the discrete-time frequency spectra, the data detection and processing apparatus moreover comprises a cepstrum analysis unit for generating a cepstrum with different actual cepstra values from the temporally and spatially aggregated discrete frequency spectra, the data detection and processing apparatus moreover comprises a computer unit, which, from the cepstra generated thus, generates actual cepstra intervals in a predefined time interval, said actual cepstra intervals comprising a plurality of adjacent actual cepstra values, as a result of which an actual cepstrum value, which is establishable from at least three adjacent actual cepstra intervals, is generable, the data detection and processing apparatus comprises a unit which calculates an intended/actual comparison of the actual cepstrum value generated thus and an intended cepstrum value determined in advance.

The following renders it possible to quickly identify simple damage, in particular the initial damage to a machine, in particular on the blades of a gas turbine. Hence, a further development of this initial damage to total loss can be stopped in a quick and reliable manner. By way of embodiments of the invention, it is furthermore possible to avoid cost-intensive repairs as relatively small initial damage can usually be rectified with less outlay. The intended/actual comparison (alternatively "intended/actual comparison" throughout the specification means "a comparison of or between the intended to actual") carried out by the device supplies a simple, analog characteristic, which can be transferred to the process control system of the installation and observed by simple threshold monitoring. Advantageously, a robust device according to embodiments of the invention are obtained, which is independent of other parameters (e.g. the operating states of the machine such as load, ambient conditions, etc.).

Preferably, the spatial aggregation unit combines the discrete-time frequency spectra to form spatially virtual frequency spectra; wherein subsequently the temporal aggregation unit combines the spatially virtual frequency spectra to temporally-spatially virtual target frequency spectra, and wherein subsequently the cepstrum analysis unit generates a cepstrum with different actual cepstra values from the temporally-spatially virtual target frequency spectrum.

Preferably, the data detection and processing apparatus generates an intended cepstrum with the aid of an undamaged machine, from which the intended cepstrum value agreeing with the actual cepstrum value is then determinable. As a result, a suitable intended cepstrum value can be determined very easily.

Preferably, the actual cepstrum value is correlatable with the degree of damage of the monitoring machine. As a result, damage is also identifiable/derivable directly from the actual cepstrum value.

Preferably, a machine unit is provided, which initiates an emergency operation if a predefined threshold of the intended/actual comparison is exceeded. As a result, time for introducing an emergency operation is saved. Hence, total loss may possibly be avoided.

Preferably, the plurality of pressure sensors are dynamic pressure sensors. These are particularly well-suited to use in rotationally dynamic systems.

Preferably, the machine is a compressor with rotor blades and a rotor. In a preferred refinement, the compressor comprises a compressor circumference and a compressor outlet, wherein the plurality of pressure sensors are attached over the compressor circumference at the compressor outlet. This serves the plausibility, to improve the availability and the communication of the detected flow parameters over the circumferential coordinate.

Preferably, the compressor comprises a compressor circumference and the pressure sensors are not attached below these rotor blades on the compressor circumference. This would lead to large pressure amplitudes, which would have an inexpedient effect on the device.

In a preferred refinement, the rotor has a rotary frequency. Preferably, the minimum bandwidth of the data detection and processing apparatus emerges from the maximum number of rotor blades multiplied by twice the rotary frequency of the rotor. Using this, the spectra and the cepstra can be detected correctly.

Preferably, the machine has a compressor outlet collection chamber and a burner region, wherein the pressure sensors are arranged in the compressor outlet collection chamber and/or burner region.

Preferably, the actual cepstrum value, which is establishable from at least three adjacent actual cepstra intervals, is generable by summation. Any other expedient calculation method is also suitable.

The second aspect is achieved by specifying a method for detecting the current state of damage of a machine, in which a pressure over a time period of the machine to be monitored is detected by way of a plurality of pressure sensors, and a plurality of pressure signals, which exist in the time domain, are output, comprising the following steps:
  transforming the pressure signals existing in the time domain into the frequency domain as discrete-time frequency spectra by a fast Fourier analysis device provided in a data detection and processing apparatus,
  spatially and temporally combining the discrete-time frequency spectra into temporally and spatially aggregated discrete frequency spectra by a spatial aggregation unit and temporal aggregation unit provided in the data detection and processing apparatus,
  generating a cepstrum with different actual cepstra values from the temporally and spatially aggregated discrete frequency spectra by a cepstrum analysis unit,
  generating, from the cepstra generated thus, actual cepstra intervals comprising a plurality of adjacent actual cepstra values in a predefined time interval by a computer unit, generating an actual cepstrum value which is established from at least three adjacent actual cepstra intervals,
  calculating an intended/actual comparison of the actual cepstrum value generated thus and an intended cepstrum value determined in advance.

The method according to embodiments of the invention and the device according to embodiments of the invention can be used both permanently under real-time conditions with an output delay of the order of seconds to minutes and for the subsequent analysis of stored data for analyzing damage.

Preferably, the discrete-time frequency spectra are combined to spatially virtual frequency spectra in the spatial aggregation unit, wherein, subsequently, the spatially virtual frequency spectra are combined to temporally-spatially virtual target frequency spectra in the temporal aggregation unit, and wherein, subsequently, a cepstrum with different actual cepstra values is generated from the temporally-spatially virtual target frequency spectrum in the cepstrum analysis unit.

Preferably, temporal combining of the spatially virtual frequency spectra or the discrete-time frequency spectra is carried out using the peak-hold algorithm or by forming an average.

Preferably, the actual cepstrum value is generated from at most nine adjacent actual cepstra intervals. The actual cepstrum value can also be generated from all available adjacent actual cepstra intervals or from a subset thereof. Preferably, the actual cepstrum value, which is establishable from at least three adjacent actual cepstra intervals, is generated by summation. However, any other suitable calculation method can be applied.

In a preferred refinement, the actual cepstrum value correlates with the degree of damage of the machine to be monitored.

Preferably, emergency operation is initiated by a provided machine unit if a predefined threshold of the intended/actual comparison is exceeded.

BRIEF DESCRIPTION

Some of the embodiments will be described in detail, with reference to the following figures, wherein like designations denote like members, wherein:

FIG. 1 schematically shows the method according to embodiments of the invention, FIG. 2 shows the method according to embodiments of the invention on the basis of an exemplary evaluation.

DETAILED DESCRIPTION

FIG. 1 schematically shows the method. Here, suitable pressure sensors for detecting the current state of damage are arranged in a machine. Without loss of generality, a compressor is used as a machine below. Dynamic pressure sensors are arranged in the flow channel in the compressor, in particular in the axial compressor of a gas turbine. Here, the placement of the pressure sensors is directed to the desired detection sensitivity. Advantageously, a plurality of these pressure sensors, i.e. measurement locations, is arranged along the circumference of the outlet of the compressor with an identical longitudinal coordinate. This serves the plausibility, to improve the availability and the communication of the detected flow parameters over the circumferential coordinate. It is advantageous if the pressure sensors are not attached to those walled regions over which rotor blades pass directly. This would lead to large pressure amplitudes, which could interfere with the intended analysis. It may even be sufficient to apply dynamic pressure sensors which are arranged downstream and which are originally provided for different purposes and which are additionally provided. This means e.g. dynamic pressure sensors in the compressor outlet collection chamber or in the burner region of the machine, which serve to monitor the combustion. As a result, it is advantageously possible to dispense with additionally arranged pressure sensors. However, it is also possible to use pressure sensors which are arranged in drains of the compressor or other walled regions of the compressor contacted by the flow. Naturally, the pressure sensors can also be arranged differently. As a result of sound propagation at the speed of sound plus the flow speed, caused for physical reasons, embodiments of the invention are also able to detect downstream the occurring flow parameters for damage analysis and for identifying the damage to blades.

The dynamic pressure sensors advantageously have a suitable sensitivity, e.g. a sensitivity of 10 Pa, and a sufficient dynamic bandwidth. The minimum bandwidth in hertz of the overall pressure measuring chain is advantageously greater than the product of the maximum number of rotor blades of all involved stages of the axial compressor, multiplied by twice the rotary frequency of the rotor.

The dynamic pressure sensors detect the dynamic pressure over a time period of the machine to be monitored, in this case a compressor, and output a plurality of dynamic pressure signals. Here, the dynamic pressure signals are individual signals. These individual signals, i.e. pressure signals of the dynamic pressure sensors, are present in the time domain, i.e. as variable dependent variables with time as independent parameter. The dynamic pressure signals are detected by a suitable data detection and processing apparatus and subjected to signal processing 1. The data detection and processing apparatus initially comprises a fast Fourier analysis device for carrying out a transformation of the pressure signals, present in the time domain, into the frequency domain as discrete-time frequency spectra 2. Here, the transformation is preferably a Fast Fourier Transform (FFT).

The FFT is carried out using specific parameters, such as e.g. block dimension, window function or overlap. These parameters should be selected in an ideal manner in accordance with the desired accuracy and the desired frequency resolution and they should be selected in accordance with the specific application.

After carrying out the FFT, the individual pressure signals in the frequency domain exist as discrete-time frequency spectra in the amplitude or power amplitude domain.

The data detection and processing apparatus moreover comprises a spatial aggregation unit and a temporal aggregation unit, which combine the discrete frequency spectra originating in time and space from the sensors distributed around the circumference in time and space to temporally-spatially virtual frequency spectra, 3 and 4.

By way of example, the spatial aggregation unit is now applied first to the discrete-time frequency spectra. The spatial aggregation substantially is the combination of the individual spectra from a plurality of measurement points to form a virtual signal or to form the spectrum of a virtual measurement point, 3. As a result, spatially virtual frequency spectra are now generated. Here, averaging or the peak-hold method can be used as calculation method.

Furthermore, the data detection and processing apparatus moreover comprises a temporal aggregation unit, which combines the available individual spatially virtual frequency spectra in time to form a temporally-spatially virtual target frequency spectrum (temporal aggregation) 4.

That is to say, the temporal aggregation unit carries out a temporal aggregation by virtue of a plurality of discrete individual spectra or frequency spectra of the spatially virtual measurement point being combined to form a temporally-spatially virtual signal or spectrum. Here, averaging or the peak-hold method can be used as calculation method. That is to say, the temporal aggregation combines a plurality of discrete individual spectra of a real or spatially virtual measurement point to form a virtual signal or spectrum.

Naturally, the temporal aggregation can take place without a preceding spatial aggregation. It is also possible for the spatial aggregation to be carried out without the temporal aggregation, and also for the temporal aggregation to be carried out prior to the spatial aggregation. However, this is not explained in any more detail here. Here, the temporal aggregation is advantageously carried out according to the peak-hold algorithm or by forming an average.

The temporal and spatial aggregations are advantageous in that the computational complexity is reduced in the subsequent process steps, without information losses occurring.

The signals or spectra obtained by the spatial and temporal aggregation are now subjected to further signal processing likewise taking place continuously in time.

To this end, the data detection and processing apparatus comprises a cepstrum analysis unit 5 for generating cepstra with different cepstra values from the temporally-spatially virtual target frequency spectrum. In the cepstrum analysis unit, a logarithmic operation is applied to the spectra in the complex number range and this is subsequently subjected to an inverse FFT for the purposes of generating a cepstrum. Here, it is possible to apply the natural logarithm or the logarithm with base 10.

Furthermore, the data detection and processing apparatus comprises a computer unit which generates at least three actual cepstra intervals comprising a plurality of adjacent cepstra values at a predefined time interval $\Delta T$ from the cepstra generated thus, as a result of which an actual cepstrum value, which comprises at least three adjacent actual cepstra intervals, is generable 6. Here, the at least three adjacent actual cepstra intervals are preferably summed. Naturally, it is also possible to use different calculation principles. Here, the actual cepstrum value can also be generated from 4 to 9 adjacent cepstra intervals. Here, the predefined time interval $\Delta T$ depends on the rotational speed of the machine and represents the period of one revolution of the rotor. It is also possible not to fixedly predetermine the time interval $\Delta T$, but rather to calculate it continuously on the basis of the currently measured rotational speed of the rotor.

Moreover, the data detection and processing apparatus comprises a unit which determines an intended/actual comparison of the actual cepstrum value generated thus and a predetermined intended cepstrum value 7.

Here, the intended cepstra are generated with the aid of an undamaged machine, from which the intended cepstrum value agreeing with the actual cepstrum value is then determinable.

As a result of this intended/actual comparison of the actual cepstrum value generated thus and a predetermined intended cepstrum value, it is possible to form an intended/actual value, which is also referred to as threshold below.

The actual cepstrum value established thus represents a characteristic which has a direct positive correlation with the state of damage of e.g. a compressor or turbine arrangement consisting of stator and rotor blades. The state of damage can be deduced directly from the numerical magnitude of said actual cepstrum value. This means that a threshold can be defined after calculating the intended/actual comparison, below which threshold an undamaged compressor or turbine can be assumed. By contrast, there is damage if this threshold is exceeded during running operation. Likewise, it is possible to define a limit, above which emergency operation must be introduced.

FIG. 2 shows an exemplary evaluation of the method according to embodiments of the invention. The graph contains the data of six cepstra which originate from an identical compressor of a gas turbine, but with different levels of damage. To aid distinction therebetween, they have been staggered, i.e. drawn at a graphical distance above one another, because they would otherwise cover one another.

The lower curve 50 originates from a compressor without damage, i.e. the intended cepstra. There, only small peak amplitudes, i.e. small intended cepstra values, occur at predefined time intervals ΔT 70. Since the sampling rate of the measurement value detection system is very constant and the rotational speed of the machine may vary slightly, the actual cepstra values of the cepstra 50-55 do not lie exactly over one another in the calculated time intervals 70 in the shown example. Therefore, (in this case five) actual/intended cepstra intervals 60, 61, 62, 63, 64 are formed.

The actual/intended cepstra intervals 60, 61, 62, 63, 64 are marked by lines. The comparison with the uppermost line 55, which originates from a damaged compressor, yields substantially higher actual cepstra values in the intervals 61-64 than in the intended cepstra intervals, which are represented by the lowermost line 50.

A certain number of actual cepstra intervals (in this case the five marked intervals) are defined at a defined time interval 70. These time intervals 70 are directly correlated with the rotational speed of the machine.

The cepstra are present as discrete numerical sequences. Since the sampling rate of the measurement value detection system is very constant and the rotational speed of the machine may vary slightly, the calculated time intervals 70 do not fit exactly into the discrete time intervals of the cepstra 50-55.

In order to obtain a robust method which is relatively independent of other parameters, e.g. the operating states of the machine such as load, ambient conditions, etc., use is now made of up to nine of these actual/intended cepstra intervals in order to establish an actual cepstrum value or intended cepstrum value. As a preferred method for generating the actual/intended cepstrum value, it is possible to apply the addition of all cepstra values lying in the defined time intervals 60 . . . 64. However, it is also possible to apply further methods, such as e.g. forming the average of all cepstra values lying in the defined time intervals 60 . . . 64. However, what is characterizing for all possible methods is that a secured correlation exists between the generated value and the amplitude of the cepstra amplitudes lying in the defined time intervals.

In the case of a damaged machine with bent, broken blades, more intensive, rotational speed-synchronous turbulence is generated. The method according to embodiments of the invention and the device according to embodiments of the invention for directly assessing the current state of damage render it possible to identify damage which is initially small in a timely fashion and render it possible to prevent total loss of the machine. This has as a consequence direct savings of repair outlay of a significant amount. At the same time, the time duration of the repair measure is reduced, as a result of which an additional saving effect is achieved.

The method according to embodiments of the invention and the device according to embodiments of the invention can be used both permanently under real-time conditions with an output delay of the order of seconds to minutes and for the subsequent evaluation of stored data for analyzing the damage. The examination of real instances of damage has shown the effectiveness of the device and the method.

The invention claimed is:

1. A device for detecting the current state of damage of a machine, comprising:
a plurality of pressure sensors for detecting the pressure over a time period of the machine to be monitored and outputting a plurality of pressure signals, wherein the pressure signals exist in the time domain, and a data detection and processing apparatus for detecting the pressure signals from the pressure sensors and processing the pressure signals,
wherein:
the data detection and processing apparatus comprises a fast Fourier analysis device for carrying out a transformation of the pressure signals existing in the time domain into a frequency domain as discrete-time frequency spectra;
the data detection and processing apparatus furthermore comprises a spatial aggregation unit and a temporal aggregation unit, which combine the discrete-time frequency spectra, such that temporally and spatially aggregated discrete frequency spectra are generable, wherein the application of the spatial aggregation unit and also the application of the temporal aggregation unit is performable in a different sequence on the discrete-time frequency spectra;
the data detection and processing apparatus moreover includes a cepstrum analysis unit for generating a cepstrum with different actual cepstra values from the temporally and spatially aggregated discrete frequency spectra;
wherein the data detection and processing apparatus moreover includes a computer unit, which, from the cepstra generated, generates actual cepstra intervals in a predefined time interval, said actual cepstra intervals comprising a plurality of adjacent actual cepstra values, as a result of which an actual cepstrum value, which is establishable from at least three adjacent actual cepstra intervals, is generable; and
wherein the data detection and processing apparatus comprises a unit which calculates a comparison of the actual cepstrum value generated and an intended cepstrum value determined in advance.

2. The device for detecting the current state of damage of a machine as claimed in claim 1,
wherein:
the spatial aggregation unit combines the discrete-time frequency spectra to form spatially virtual frequency spectra and subsequently the temporal aggregation unit combines the spatially virtual frequency spectra to temporally-spatially virtual target frequency spectra; and
and subsequently the cepstrum analysis unit generates a cepstrum with different actual cepstra values from the temporally-spatially virtual target frequency spectrum.

3. The device for detecting the current state of damage as claimed in claim 1 wherein the data detection and processing apparatus generates the intended cepstrum with the aid of an undamaged machine, from which the intended cepstrum value agreeing with the actual cepstrum value is then determinable.

4. The device for detecting the current state of damage as claimed in claim 1, wherein the actual cepstrum value is correlatable with the degree of damage of the monitoring machine.

5. The device for detecting the current state of damage as claimed in claim 1, wherein a machine unit is provided, which initiates an emergency operation if a predefined threshold of the comparison is exceeded.

6. The device for detecting the current state of damage as claimed in claim 1, wherein the plurality of pressure sensors are dynamic pressure sensors.

7. The device for detecting the current state of damage as claimed in claim 1, wherein the machine is a compressor with rotor blades and a rotor.

8. The device for detecting the current state of damage as claimed in claim 7, wherein the compressor comprises a compressor circumference and a compressor outlet and the plurality of pressure sensors are attached over the compressor circumference at the compressor outlet.

9. The device for detecting the current state of damage as claimed in claim 7, wherein the compressor comprises a compressor circumference and the pressure sensors are not attached below these rotor blades on the compressor circumference.

10. The device for detecting the current state of damage as claimed in claim 7, wherein the rotor has a rotary frequency and the minimum bandwidth of the data detection and processing apparatus emerges from the maximum number of rotor blades multiplied by twice the rotary frequency of the rotor.

11. The device for detecting the current state of damage as claimed in claim 1, wherein the machine has a compressor outlet collection chamber and a burner region, and the pressure sensors are arranged in at least one of the compressor outlet collection chamber and the burner region.

12. The device for detecting the current state of damage as claimed in claim 1, wherein the actual cepstrum value, which is establishable from at least three adjacent actual cepstra intervals, is generable by summation.

13. A method for detecting the current state of damage of a machine, in which a pressure over a time period of the machine to be monitored is detected by way of a plurality of pressure sensors, and a plurality of pressure signals, which exist in the time domain, are output comprising the following steps:
    transforming the pressure signals existing in the time domain into the frequency domain as discrete-time frequency spectra by a fast Fourier analysis device provided in a data detection and processing apparatus;
    spatially and temporally combining the discrete-time frequency spectra into temporally and spatially aggregated discrete frequency spectra by a spatial aggregation unit and temporal aggregation unit provided in the data detection and processing apparatus;
    generating a cepstrum with different actual cepstra values from the temporally and spatially aggregated discrete frequency spectra by a cepstrum analysis unit;
    generating, from the cepstra generated, actual cepstra intervals comprising at least a plurality of adjacent actual cepstra values in a predefined time interval by a computer unit;
    generating an actual cepstrum value which is established from at least three adjacent actual cepstra intervals; and
    calculating a comparison of the actual cepstrum value generated and an intended cepstrum value determined in advance.

14. The method for detecting the current state of damage of a machine as claimed in claim 13, wherein:
    the discrete-time frequency spectra are combined to spatially virtual frequency spectra in the spatial aggregation unit;
    subsequently, the spatially virtual frequency spectra are combined to temporally-spatially virtual target frequency spectra in the temporal aggregation unit;
    subsequently, a cepstrum with different actual cepstra values is generated from the temporally-spatially virtual target frequency spectrum in the cepstrum analysis unit.

15. The method as claimed in claim 13, wherein
temporal combining of the spatially virtual frequency spectra or the discrete-time frequency spectra is carried out using the peak-hold algorithm or by forming an average.

16. The method for detecting as claimed in,
claim 13, wherein the actual cepstrum value is generated from at most nine adjacent actual cepstra intervals.

17. The method for detecting the current state of damage as claimed in 6, claim 13, wherein the actual cepstrum value, which is establishable from at least three adjacent actual cepstra intervals, is generated by summation.

18. The method for detecting as claimed in,
claim 13, wherein the actual cepstrum value correlates with the degree of damage of the machine to be monitored.

19. The method for detecting as claimed in,
claim 13, wherein emergency operation is initiated by a provided machine unit if a predefined threshold of the comparison is exceeded.

* * * * *